June 11, 1935.  G. M. FARABOUGH  2,004,858
POTATO CUTTER
Filed Sept. 29, 1933   2 Sheets-Sheet 1
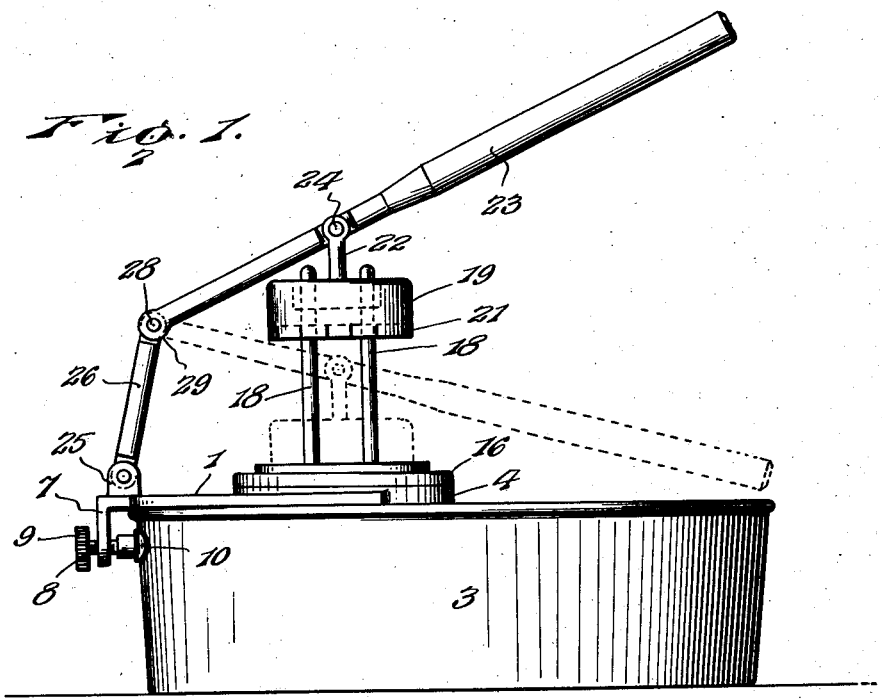
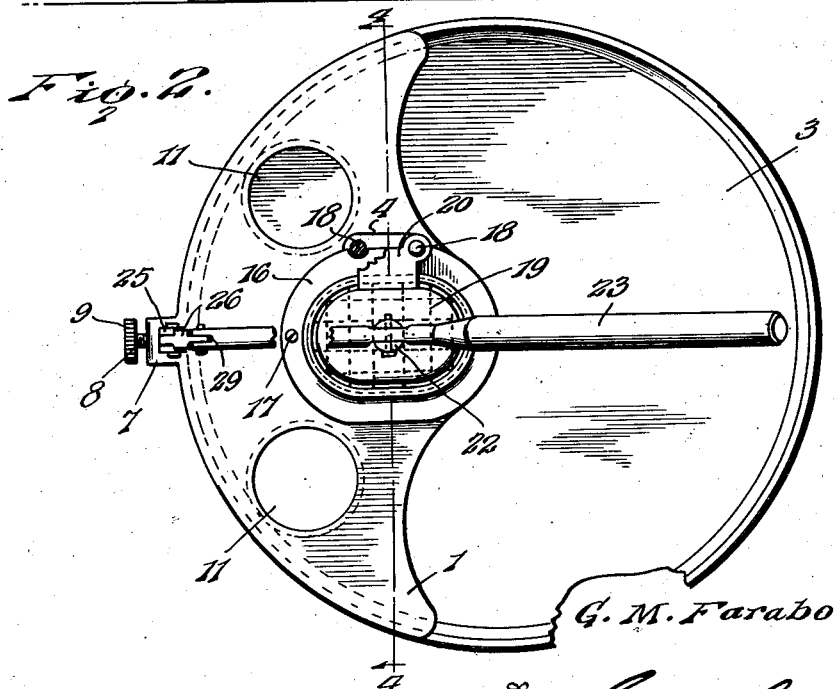
Inventor
G. M. Farabough.
By Lacey & Lacey
Attorneys

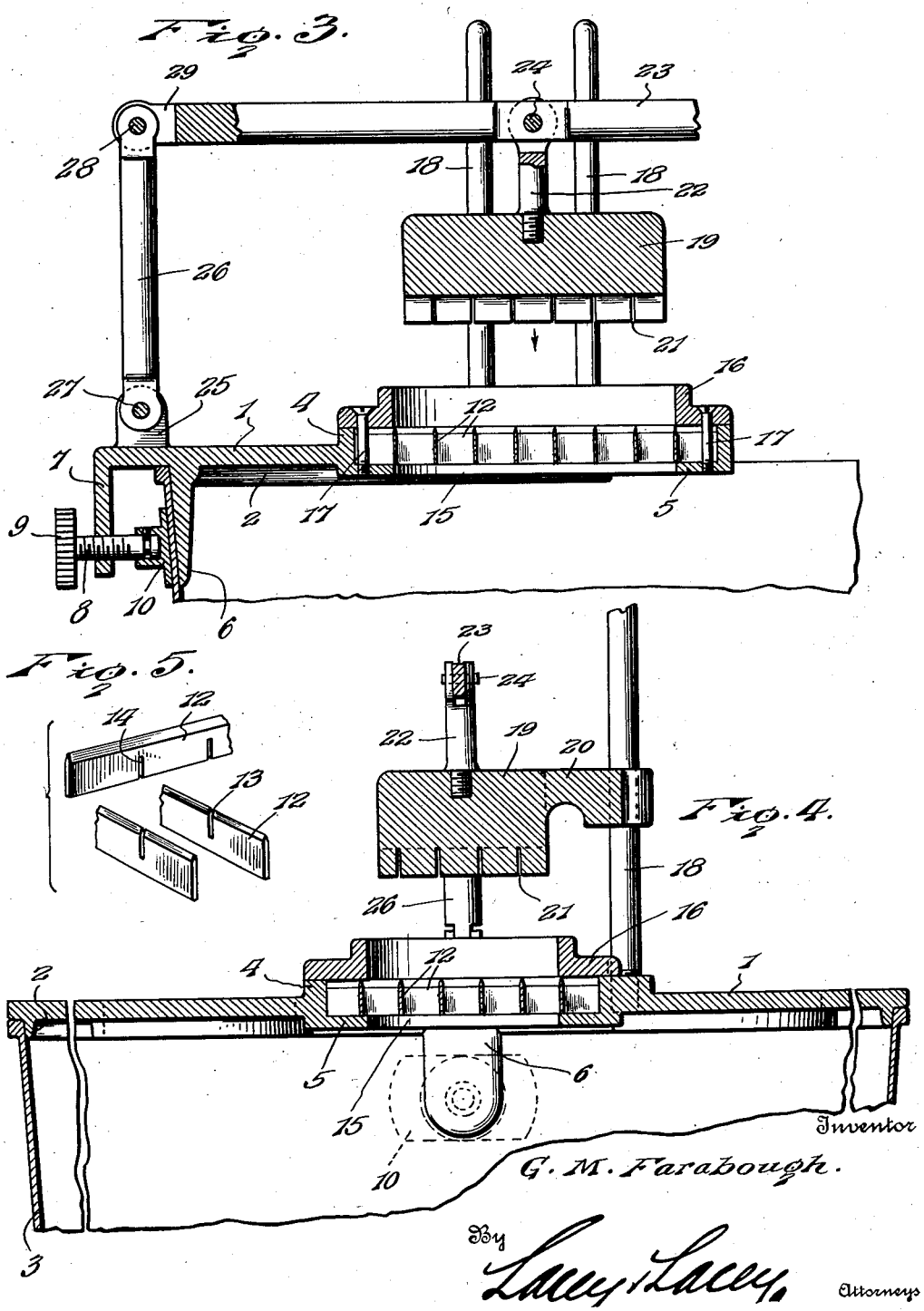

Patented June 11, 1935

2,004,858

UNITED STATES PATENT OFFICE 2,004,858

POTATO CUTTER

George M. Farabough, Rogers, Ark.

Application September 29, 1933, Serial No. 691,545

1 Claim. (Cl. 146—169)

This invention is a device for cutting potatoes preparatory to frying the same, and has for its object the provision of a tool which may be readily supported upon a pan or other suitable receptacle and operated to quickly cut a potato into the desired pieces. The invention provides a simple machine which will operate efficiently at all times and which will be inexpensive and durable. The invention is illustrated in the accompanying drawings and will be hereinafter fully described, the novel features being particularly defined in the appended claim.

In the drawings,

Figure 1 is a side elevation of a potato cutter embodying the invention arranged in position for use, Figure 2 is a top plan view of the same, partly broken away, Figure 3 is an enlarged vertical section taken longitudinally of the handle or operating lever, Figure 4 is a vertical section on the line 4—4 of Figure 2, Figure 5 is a detail perspective view showing the construction of the knife or cutter.

In carrying out the present invention, there is provided a base plate 1 which may be of any desired size and is preferably of the substantially crescent shape shown in Figure 2, the arcuate edge of the plate being formed with a depending flange 2 adapted to fit within a pan 3, as clearly shown in Figure 4, the margin of the base plate projecting beyond the flange so as to rest upon the edge of the pan and be thereby supported. The base plate is provided, adjacent its inner edge and midway its ends, with an opening in which a cutter is mounted, said opening being defined by an upstanding flange or boss 4, and a horizontally disposed flange 5 being formed on the inner wall of the boss, at the lower end thereof, as clearly shown in Figures 3 and 4, to support the cutter. Midway the arcuate edge of the base plate, a depending lug 6 is formed thereon and this lug fits against the inner surface of the side of the pan, as shown clearly in Figure 3, while alined with said lug a bracket 7 is formed on and projects outwardly from the base plate and provides a pendant bearing for a clamping screw 8 which is mounted in the lower end of the bracket. The clamping screw is provided with a milled head or thumb piece 9 to facilitate the turning of the screw, and on the inner end of the screw there is swiveled a clamping block 10 which bears against the outer surface of the side of the pan, as best shown in Figure 3, so that when the screw is turned home the pan will be clamped between the head 10 and the lug 6 and the base plate thereby firmly secured in place. Openings 11 are formed through the base plate to reduce the weight and impart a somewhat ornamental appearance thereto.

The cutter consists of a plurality of blades 12 which are arranged in two series, the blades in one series being parallel with each other and at a right angle to the blades in the other series, as will be understood upon reference to Figure 5. The blades are set on edge and the blades in one series have notches or open-ended slots 13 formed in their upper edges, while the blades in the other series have notches or open-ended slots 14 formed in their lower edges. In assembling the blades, they are brought together so that the slots 14 will register with the slots 13 and thereby permit the blades to be disposed all in the same plane and interfitted so that they will be maintained in the desired right angular relation. The ends of the blades rest upon the supporting flange 5 of the base plate and the intermediate portions of the blades span the discharge opening 15, which is defined by said flange. The blades may be provided in any desired number and spaced apart any desired distance, according to the style of fried potatoes which are to be produced. The blades are held in position upon the supporting flange 5 by a retaining plate 16 which rests upon the boss 4 and has an opening therethrough corresponding in shape and dimensions to the opening 15, countersunk openings being formed through the marginal portion of the retaining plate or ring 16 to receive cap screws 17 which engage threaded openings provided therefor in the supporting flange 5 and thereby secure the retaining plate firmly in place so that the cutter will be held in its operative position. At one side of the cap or retaining plate 16 a pair of guide rods 18 are mounted upon the base plate and rise vertically therefrom, the lower ends of these rods being threaded and engaged in threaded sockets provided therefor in the base plate and preferably in the boss 4 thereon so that the rods will be held in a vertical position, as will be understood. A plunger 19, which is preferably a wooden block, is provided to cooperate with the cutter and this plunger is formed on one side with a lateral extension 20 having vertical openings formed therethrough to slidably receive the guide rods 18 so that the plunger may be reciprocated and will be held by the rods to a rectilinear path. As shown in Figures 3 and 4, the plunger has narrow grooves 21 formed in its underside and these grooves are provided in intersecting series corresponding to the blades 12 of the cutter so that the plunger may pass below the upper edges of the blades and thereby effect a positive ejectment of the potato slices. The plunger is carried by a stem 22 which has its lower end threaded into the top of the plunger whereby the plunger will be effectively secured, and the upper end of the stem is bifurcated to span the operating lever or handle 23, a pivot pin 24 being inserted through the bifurcation of the stem and through the handle, as clearly shown, so as to connect the stem to the handle. The handle or operating lever projects beyond the plane of the plunger so that one end thereof may be easily grasped by the user and the handle consequently vibrated to effect the desired reciprocation of the plunger in order to apply pressure to a potato and force it past the cutter, and then raise the plunger to repeat the operation. Upon the upper side of the base plate, directly over the bracket 7, a pair of lugs 25 are formed and the lower end of a link 26 is pivoted to and between these lugs by a pin 27 passed therethrough, the upper end of the link being pivoted by a pin 28 to and between the sides of a fork 29 formed on the adjacent end of the handle or operating lever, as clearly shown.

From the foregoing description, taken in connection with the accompanying drawings, it will be seen that I have provided a very simple, compact, and inexpensive tool which may be readily supported upon the edge of a pan and easily manipulated to quickly slice potatoes for frying. The plunger is raised, as shown in Figure 1, and a potato is placed in position below the plunger resting upon the cutter, as will be understood. The operator then, while holding the potato in place with one hand, will grasp the lever or handle 23 with the other hand and will swing the handle downwardly so that pressure will be applied through the plunger to the potato and force the potato down past the cutter in an obvious manner, the potato being thereby divided into the desired portions which will drop at once into the pan. It is to be particularly noted that the rocking link 26 permits the handle to accommodate itself to the varying angular relations to the plunger while the plunger is held to a rectilinear path, and consequently the slices or sections of the potato will all be cut on true straight lines and uniformity will be attained. As the pivot 24 follows the vertical movement of the plunger, which is assured by the provision of the guide rods 18, the pivot 28 will move inwardly toward and then outwardly from the plunger, accordingly as the handle is in a horizontal position or is inclined upwardly above the horizontal or downwardly below the horizontal, as will be understood upon reference to the full and dotted lines in Figure 1. When the device is not to be used, the clamping screw 8 is turned outwardly so as to release the clamping block 10 from the pan and the entire tool may then, of course, be easily lifted from the pan and set aside. It will be readily noted that the cutter may be very easily removed as withdrawal of the two retaining screws 17 is all that is necessary, and therefore, the cutter may be easily cleaned and the device kept in a sanitary condition. While the device is designed primarily for the preparation of French fried potatoes, by omitting some of the blades or varying the relation of the blades any desired form of potatoes may be prepared.

Having thus described the invention, I claim:

A potato cutter comprising a base plate having an arcuate edge adapted to rest upon the rim of a pan and having a depending flange on its under side adjacent said edge to fit within the pan against walls of the pan, the base plate being formed with an opening, means at the arcuate edge of the base plate to clamp the plate to walls of the pan, an upstanding rim bordering the opening and at only one side thereof formed with sockets, a cutter mounted in said opening, guide rods rising from said rim at only the said side of the opening and spaced from each other and having their lower ends secured in the sockets, a plunger adapted to fit within the opening and having a lateral extension at only one side formed with openings through which the rods extend to slidably mount the plunger and guide vertical movement of the plunger, and means mounted upon the base plate and connected with the plunger for sliding the plunger along the rods toward and away from the cutters.

GEORGE M. FARABOUGH. [L. S.]